Jan. 20, 1959     G. H. LEONARD     2,869,810
TIME DELAY RELEASING DEVICE FOR A PARACHUTE PACK COVER
Filed Sept. 5, 1952     4 Sheets-Sheet 1
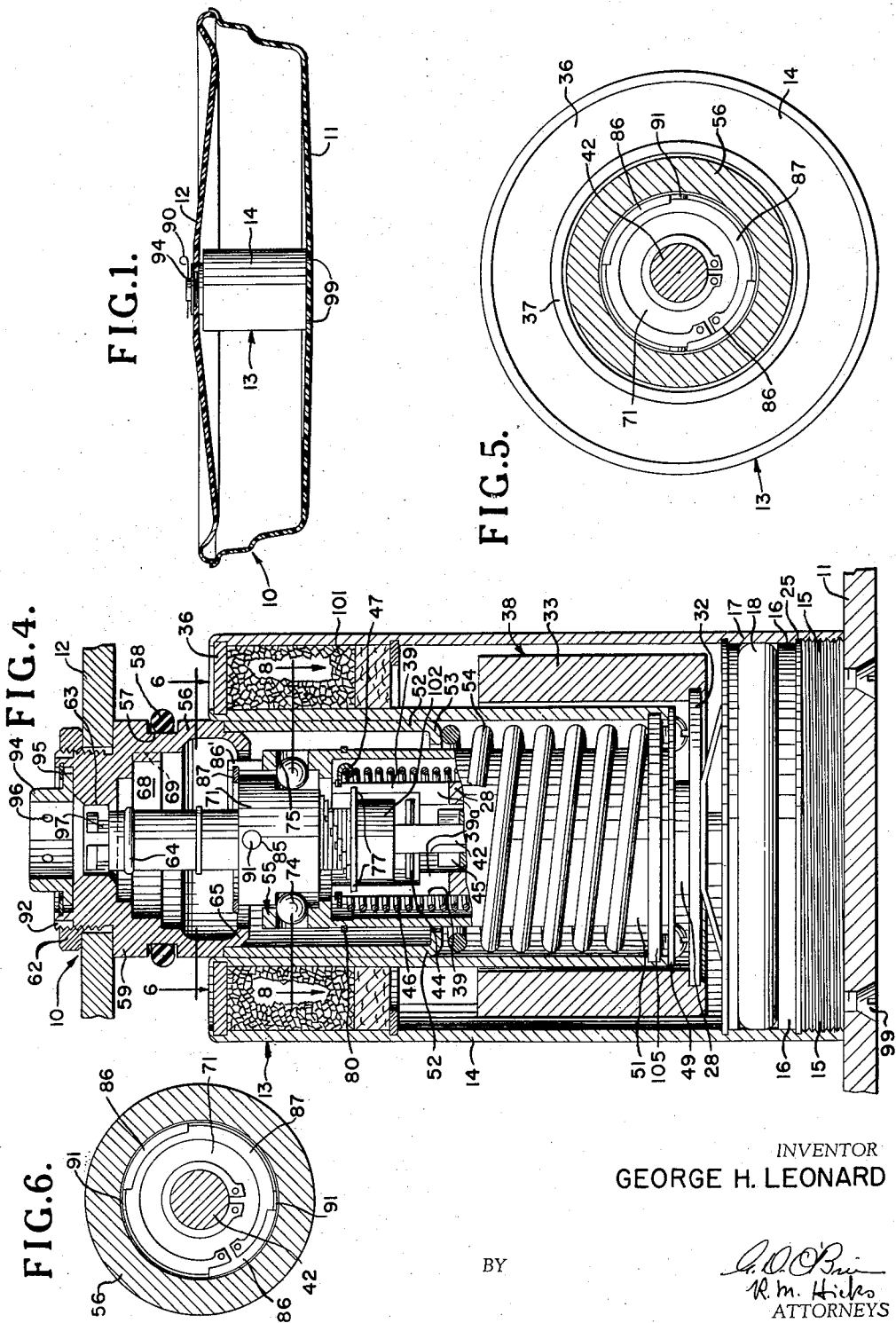
INVENTOR
GEORGE H. LEONARD
BY
ATTORNEYS

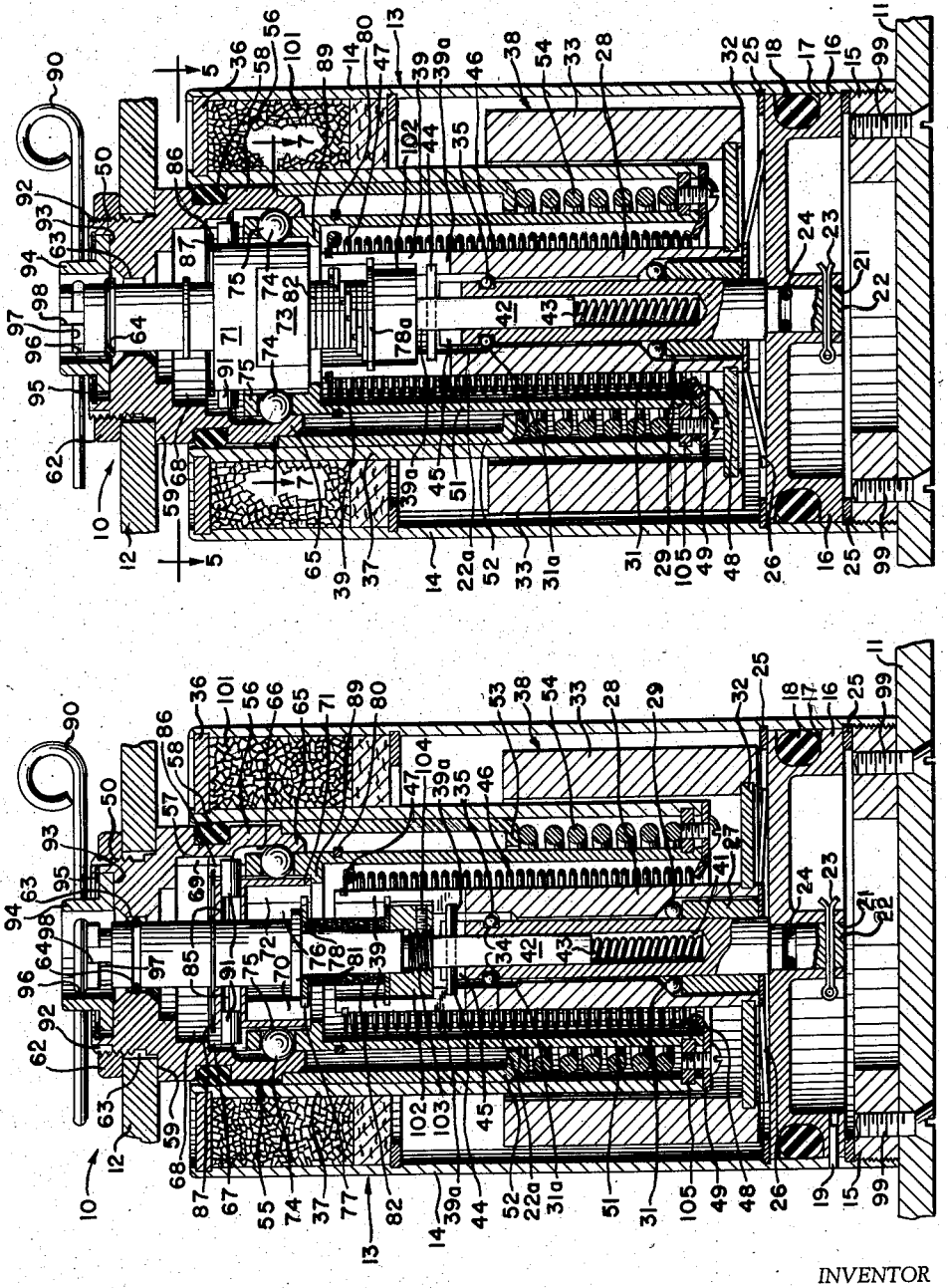

Jan. 20, 1959  G. H. LEONARD  2,869,810
TIME DELAY RELEASING DEVICE FOR A PARACHUTE PACK COVER
Filed Sept. 5, 1952  4 Sheets-Sheet 3

INVENTOR
GEORGE H. LEONARD

BY
*G. D. O'Bri*
*R. M. Hicks*
ATTORNEYS

Jan. 20, 1959  G. H. LEONARD  2,869,810
TIME DELAY RELEASING DEVICE FOR A PARACHUTE PACK COVER
Filed Sept. 5, 1952  4 Sheets-Sheet 4

INVENTOR.
GEORGE H. LEONARD
BY
ATTYS.

`2,869,810`

Patented Jan. 20, 1959

2,869,810

TIME DELAY RELEASING DEVICE FOR A PARACHUTE PACK COVER

George H. Leonard, Darien, Conn., assignor, by mesne assignments, to the United States of America as represented by the Secretary of the Navy Application September 5, 1952, Serial No. 307,983

7 Claims. (Cl. 244—150)

The invention described herein may be manufactured and used by or for the Government of the United States of America for governmental purposes without the payment of any royalties thereon or therefor.

The present invention relates to a static line eliminator and, more particularly, the invention relates to a release mechanism for the cover of a parachute pack having a time delay incorporated therein whereby the usual static line is eliminated thus permitting the release of a large number of parachutes from an aircraft without the danger of entanglement of static lines.

Prior art devices have the disadvantage of operational failure by reason of the use of escapement mechanisms and other like mechanisms for providing a time delay and which are subject to such failure.

The device of the present inventin avoids the operational failure of the prior art by providing as an object thereof a time-delay mechanism which is rugged, mechanically simple, and free of defects of the prior art.

Another object is to provide a static line eliminator having a predetermined time-delay which is compact and readily adapted to mounting within a conventional parachute pack.

A further object is to provide a mechanical static line eliminator in which the operation thereof is not affected by atmospheric conditions.

Other objects and many of the attendant advantages of this invention will be readily appreciated as the same becomes better understood by reference to the following detailed description when considered in connection with the accompanying drawings wherein:

Fig. 1 is a sectional view of a parachute pack showing the device of the present invention mounted therein;

Fig. 2 is a vertical sectional view of the device showing the components thereof in a safe position;

Fig. 3 is a vertical sectional view similar to Fig. 2 showing the components in the winding position;

Fig. 4 is a view similar to Fig. 2 showing the components in released or unwound position;

Fig. 5 is a sectional view of the device taken along the line 5—5 of Fig. 3;

Fig. 6 is a sectional view taken along the line 6—6 of Fig. 4;

Figure 7:
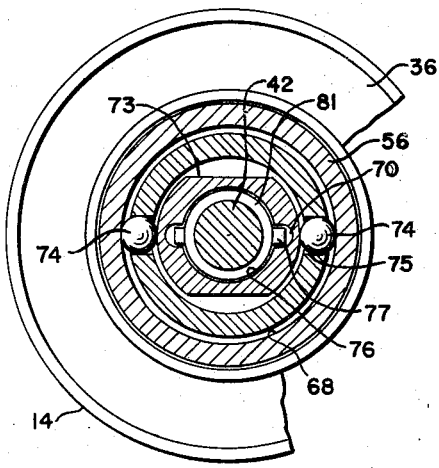
Fig. 7 is a sectional view taken along line 7—7 of Fig. 3.
Figure 8:
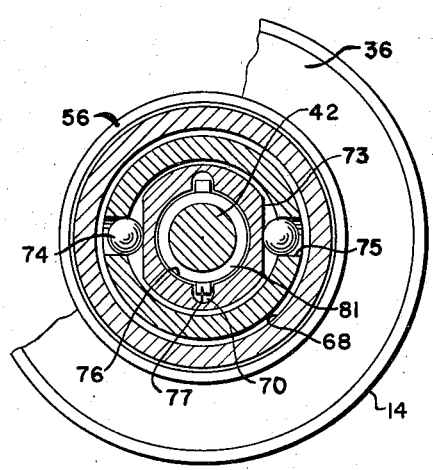
Fig. 8 is a sectional view taken along line 8—8 of Fig. 4.
Figure 9:
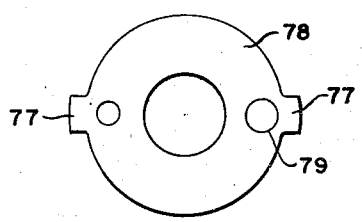
Figs. 9 and 10 are detail plan views of washers employed in the present invention.
Figure 10:
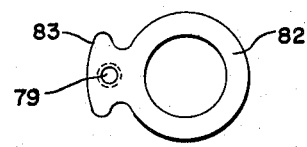
Figure 11:
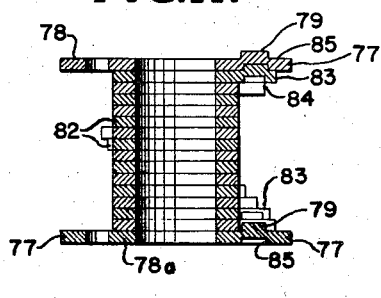
Fig. 11 is an enlarged detail sectional view of the pile of washers.

Referring more particularly to the drawings wherein like numerals indicate like parts throughout the several views, 10 indicates generally a parachute pack having a body portion 11 and a releasable cover 12. Cover 12 is releasably retained by a mechanism 13 having a cylindrical casing 14 which is in threaded engagement with the boss 15 which may be considered as being axially mounted in the body portion 11 of pack 10 and firmly secured thereto.

Mounted in casing 14 superjacent boss or adapter 15 is a base member 16 having a circumferential groove 17 which accommodates the O-ring gasket 18 for excluding moisture from the interior of casing 14. Base member 16 is fixed against rotation by pin 19 extending through casing 14 and member 16. Base member 16 is formed with an axial bore 21 for receiving a shaft 22, the shaft being fixed to member 16 by cotter pin 23. The connection between member 16 and shaft 22 is rendered moisture-proof by the O-ring gasket 24. Base member 16 is retained against axial motion by a pair of spring rings and grooves 25 in casing 14.

A spring spider 26 yieldably supports a bearing sleeve 27 in spaced relation with respect to base 16 and on shaft 22. A tubular hub member 28 is sleeved about the shaft 22, a race of balls 29 being interposed between the top of sleeve 27 and shoulder 31 of member 28. A ring 32 is fixed to the lower end of sleeve 28 and supports at the periphery thereof a weighted tubular member 33.

Shaft 22 is provided adjacent the upper end thereof with a groove 34 having a series of balls 35 mounted therein. It will thus be seen that the tubular member 28 is supported for rotation on balls 29 and 35. It will be noted in the safe position of Fig. 2 that balls 35 are loose between groove 34 and bore 22a while clearance between members 28 and 22 is small, thus preventing damage to the balls during transportation, while in the winding position of Fig. 3 and the operating position the balls 35 are lightly engaged by beveled shoulder 31a which is moved against the balls by spring spider 26. Thus the rotor 38 is supported for rotation in the winding and operating positions by balls 29 and 35 between conical surfaces 31 and 31a in member 28 of the rotor.

The upper end of casing 14 has fixed thereto a closure ring 36 which fixedly supports on the inner periphery thereof an inner tubular member 37. The member 37 extends to within spaced adjacency of the ring 32 of rotor 38. Rotor 38 comprises the tubular member 28, ring 32 and member 33. The upper end of member 28 is provided with a deep-cut slot 39.

Shaft 22 is provided with an axial bore 41 to receive a shaft 42 which is urged upwardly by spring 43 interposed between the bottom of bore 41 and the lower end of shaft 42. Shaft 42 has fixed therein a transverse pin 44 having the end thereof extending a distance from the shaft 42 to pass through slot 45 in shaft 22 and into slot 39 thus securely locking together shafts 42 and 22, and tubular member 28 when shaft 42 is held in the locked position of Fig. 2 as will be hereinafter more fully described.

A spiral spring 46 is fixedly secured to the upper end of tubular member 28 as at 47. The lower end of spring 46 is fixedly secured as at 48 to a ring 49 which in turn is fixed to a ring member 105. Spaced between member 37 and spring 46 is a tubular member 51 which is fixedly secured by ring member 105 to member 37. It will thus be seen that members 37 and 51 are fixed with respect to the cylindrical casing 14, while rotor 38, comprising members 33 and 28, is mounted for rotation around shaft 22, spring 46, when wound, providing the driving force for such rotation.

A sleeve 52 is slidably mounted in member 37 and externally of member 51. Sleeve 52 has a flange 53 at the lower end thereof and engaging a compression spring 54 which is maintained in a compressed condition by a ball locking mechanism 55.

Mechanism 55 has as an important part thereof a locking cap 56 which extends into tubular member 37, an external groove 57 in cap 56 being fitted with an O-ring gasket 58 which contacts the inner surface of member 37 to exclude moisture from the casing 14. Cap 56 is provided with a reduced threaded portion 50 which defines a shoulder 59. The threaded portion 58 extends through the cover 12 of parachute pack 10 and a nut 62 is drawn up against the cover to secure cap 56 thereto.

Cap 56 is provided with an axial orifice 63, tapered at each end and through which the upper end of shaft 42 moves, shaft 42 being provided with a groove and ring gasket 64 for excluding moisture from the casing when the device is in the safe position as shown in Fig. 2.

The lower end of cap 56 has an inturned flange 65 which forms a portion of a ball retaining groove 66 which is formed in internal bore 67 of the cap. There is formed in reduced portion 68 of opening 67 a pair of vertical grooves 69.

A ball release cam member 71 is mounted within bore 67 of cap 56 and shaft 42 is mounted for rotation and vertical movement in bore 72 of member 71. Member 71 is generally cylindrical in external shape with a pair of flat faces 73 for releasing a pair of locking balls 74 when member 71 is rotated.

The upper end portion of member 51 is formed with a pair of transverse bores 75 in which balls 74 normally rest between the cylindrical surface of cam member 71 and groove 66 of cap 56, particularly when the device is in the safe position thereof. When cam member 71 is moved in a manner to be hereinafter more fully described from the aforementioned position to a position where the flat faces 73 thereof are in alignment with the balls 74, the balls are free to move inwardly under pressure of spring 54 through sleeve 52 and lower flange surface 65 of cap 56, thus releasing cap 56 and the cover 12 of the parachute pack 10.

The cam member 71 is provided with a pair of diametrically opposed vertical grooves 70 formed in the walls of the chamber 76. Slidably mounted in grooves 70 is a pair of ears 77 formed on keying washer 78 which is formed with a lug 79 extending above the upper face thereof. Washer 78A at the lower end of washers 82 is similar to washer 78 and likewise has ears 77 and lug 79. Washer 78 is rotatably mounted on the shaft 42 and is held against vertical movement by shoulder 81 formed on the shaft. A plurality or pile of washers 82 is mounted on shaft 42 subjacent washer 78. Each of the washers 82 is formed with an extension or ear 83 having a lug 84 stamped therefrom and extending above the upper face thereof. Lug 84 on each of the washers 82 is arranged to engage the ear 83 of the next adjacent washer 82. The washer 82 immediately subjacent washer 78 has the lug 84 thereof inserted in a socket 85 of the washer 78 while the lowermost washer 82 is engaged at the ear 83 thereof by the lug 79 of keying washer 78A. The ears 77 of washer 78A engage the slot 39 of member 28. It will thus be seen that when washer 78A is rotated in either direction the lug 79 thereof engages either one side or the other of ear 83 of the next adjacent washer 82, each washer being rotated the greater part of one revolution before the lug 84 thereof engages the ear 83 of the next succeeding washer for rotation. When the last washer 82 is engaged and rotated, washer 78 is rotated thereby to rotate the cam member 71. Cam member 71 has a pair of radial bores 85 adjacent the upper end thereof which have a pair of pins 91 mounted respectively therein and extending outwardly a distance beyond the periphery of member 71.

Figure 12:
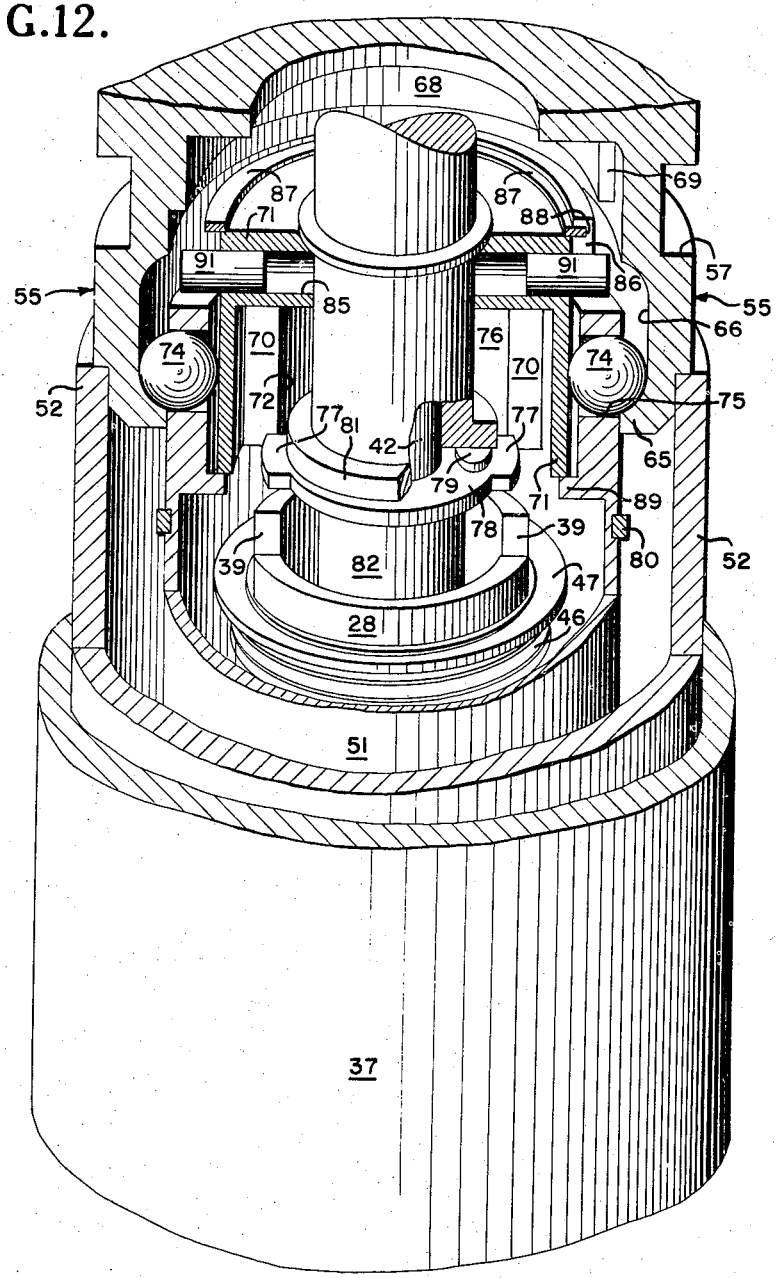
Fig. 12 is a view in perspective and partially broken away of the device of Fig. 2.

Pins 91 are adapted to engage the slots 69 in the reduced portion 68 in cap 56 when the cap is depressed by downward pressure exteriorly thereof until flange 65 contacts locking ring 80 carried by tubular member 51, Fig. 12, spring 54 being compressed as sleeve 52 is moved downwardly by the cap. The position of the cam member 71 may be adjusted by engaging pins 91 with slots 69 and rotating cap 56 and cam 71 to a desired position. Thus the balls 74 may be released from the locked position to the unlocked position or vice versa without disassembling the locking mechanism. If desired, in order to assist in aligning cam 71 with respect to the balls 74, reference marks may be inscribed on the cap 56 and ring 36.

In order to retain cam member 71 against axial movement and to limit the rotary motion thereof, a pair of extensions 86 are formed on fixed tubular member 51 at diametrically opposed points. Locking ring 87 is set in grooves 88 in extensions 86 thus to retain cam member 71 against upward motion, the lower end being retained against downward motion by flange 89 of fixed member 51. The rotary motion of member 71 is limited by the engagement of pins 91 thereof with extensions 86, thus when the pins engage extensions 86 on one side thereof, the member 71 is in ball locking position, while when the pins 91 engage the other side of extensions 86, member 71 is in ball releasing position.

The cap 56 is provided with notches 92 which are adapted to receive a wrench (not shown) for rotation of the cap, as aforedescribed.

Cap 56 has a recess 93 formed in the upper end thereof for receiving a flanged cylindrical member 94, member 94 being retained by locking ring 95. Off-center bores 96 are drilled laterally in member 94, a safety pin 90 initially passing therethrough to retain shaft 42 in the safe position. It is, of course, understood that prior to launching of the parachute the safety pin 90 may be replaced by a conventional arming wire (not shown).

In order to wind spring 46, pin 90 is removed from bores 96, shaft 42 moving outwardly under action of spring 43. Pin 44 moves out of slot 45 of fixed shaft 22 as shaft 42 moves upwardly. When a circumferential groove 97 formed in 42 adjacent the upper end thereof is in alignment with bores 96, pin 90 is reinserted in bores 96 and through a portion of groove 97 thus locking shaft 42 against endwise movement and in the winding position, as shown in Fig. 3 of the drawings. The ends of pin 44 are retained in portions 39a of slots 39 of hub 28, thus when shaft 42 is rotated in the winding direction by insertion of a screw driver or other suitable tool (not shown) in slot 98, pin 44 rotates rotor 38 which winds spring 46.

When spring 46 is wound, pin 90 is removed and shaft 42 being held by the screw driver, is pushed into the safe position (Fig. 1), pin 44 engaging slot 45 of fixed member 22 thus locking the rotor against movement.

When the parachute is released from an aircraft the shaft 42 is released by the pin 90 or the arming wire being withdrawn from member 94. Shaft 42 under action of spring 43 moves to the released or unwind position (Fig. 4). In this position rotor 38 is free by reason of movement of pin 44 out of portions 39a of slots 39 to rotate under action of the wound spring 46. As rotor 38 rotates, washer 78A is rotated by means of ears 77 engaging slot 39. After the greater portion of one revolution, lug 79 engages ear 83 of one of the washers 82 and so on through a plurality of washers 82 and a washer 78, the ears 77 of washer 78 engaging grooves 70 of cam member 71, the cam being in ball-locking position. It is, of course, understood that the number of washers 82 may be varied to either prolong or shorten the period of delay between release of shaft 42 by the arming wire or pin 90 and the release of the balls 74.

When cam 71 is turned by ears 77 of washer 78 to the ball-releasing position, balls 74 release cap 56 thus releasing the cover 61 of parachute pack 10 which, in turn, cause the release of the parachute.

Boss or adapter 15 is preferably fastened to body portion 11 by a plurality of screws 99.

If desired the interior of cylindrical casing 14 may be maintained in a dry condition by mounting therein a desiccator 101 which may be of any well known variety suitable for the purpose.

The washers 82, 78 and 78A are retained with clearance for free rotation on shaft 42 by threaded sleeve 102 which engages threads 103 of shaft 42 and is held in locked adjustment by set screw 104.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Apparatus for releasing the cover of a parachute pack after a predetermined time delay and comprising in combination, a parachute pack, a cylindrical member fixed axially in said pack, a cover for said pack, an internally flanged member fixed axially on said cover and adapted to be inserted into said cylindrical member, a cap element engaging said flanged member, yieldable means engaging said flanged member and adapted to eject said flanged member from said cylindrical member, ball-locking means comprising a plurality of balls supported in said cylindrical member and in locking engagement with said cap to prevent the ejection of the cap and flanged member, a cam member rotatively supported in said cylindrical member and initially retaining said ball-locking means in locking engagement with said cap, a normally locked rotor mounted for rotation within said cylindrical member, said rotor comprising an annular inertial mass coaxially rotatable therewith, a resilient energy storing device operatively connected to said rotor for rotating the rotor at a continually increasing rate of rotation as the rotor is released, a washer pile connected at one end thereof to said rotor and at the other end thereof to said cam member, each of the washers of said pile having a lost motion connection with the next adjacent washers for receiving therefrom and imparting thereto rotative motion, and releasable means operatively connected to said rotor for retaining the rotor against movement by said energy storing device and for permitting rotation of the rotor when released, said rotor when rotated causing step-by-step rotation of the washers until rotation of all washers is accomplished whereupon the cam is suddenly rotated to release the balls in response to the kinetic energy imparted thereto by said inertial mass thus causing release of the flanged member from the cylindrical member and release of the cover from the parachute pack.

2. Time-delay releasing apparatus for a parachute pack cover and comprising, in combination, a dish-shaped body member, a cover for said body member, first locking apparatus secured to said body member, second locking apparatus secured to said cover and having interlocking engagement with said first locking apparatus, a normally locked rotor comprising an annular inertial mass carried by said first locking apparatus, spring means for driving said rotor at a continuously increasing rate of rotation, means operatively connected to said rotor for holding the rotor against rotation by said spring means, and a pile of rotatably mounted washers having lost motion interconnections, said pile of washers being connected at one end to said rotor and at the other end to said first locking apparatus whereby a predetermined time-delay is interposed between initiation of rotation of said rotor and initiation of rotation of said first locking apparatus in response to the kinetic energy imparted thereto by said inertial mass, such delay being dependent upon the number of washers in said pile, said first locking apparatus when rotated releasing said second locking apparatus to release said cover.

3. Apparatus for releasing the cover of a parachute pack after a predetermined time delay and comprising, in combination, a parachute pack, ball locking means secured to said pack, a cover for said pack, releasable means fastened to said cover and initially locked by said ball locking means to said pack, a normally locked spring driven rotor mounted in said pack, said rotor comprising an inertial mass, means for releasing said rotor for rotation by said spring at an ever increasing rate, said last named means being operatively connected to said rotor, a cam member mounted adjacent to said ball locking means for maintaining said locking means locked and for releasing said locking means when rotated, a washer pile connecting said rotor with said cam member, a shaft having said washer pile rotatably mounted thereon, and lost motion means interconnecting the washers of said pile for progressively imparting motion to each washer in turn as the rotor is rotated, said lost motion means imparting a time delay between initiation of rotation of the rotor and release of the ball locking means in response to the kinetic energy of said inertial mass suddenly applied thereto, said delay being in multiples of the number of washers in said pile.

4. Apparatus for releasing the cover of a parachute pack after a predetermined time delay and comprising in combination, a parachute pack, a ball-locking device comprising a plurality of balls and secured to said pack, a cover for said pack, a flanged member secured to said cover and having a cap adapted to be releasably secured by said ball-locking device, a rotatably mounted cam member disposed within said device and having a plurality of cam surfaces engageable with said balls for releasably retaining the balls of said ball-locking device in a locking position, a normally locked spring driven rotor comprising an annular inertial mass coaxially rotatable therewith and connected thereto, a washer pile disposed between said cam member and the rotor and having means for connecting said rotor with said cam member when the rotor has made a predetermined number of revolutions, said washer pile comprising a plurality of rotatable washers having ears extending radially therefrom, each of said ears having a lug pressed out therefrom for engagement with the ear of the next adjacent washer whereby a lost motion connection is provided between each of said washers and the next adjacent washer, means for releasably holding said rotor against rotary motion, a shaft slideably disposed within said apparatus and having means for maintaining said releasable holding means in holding position, said shaft supporting said washer pile for rotation thereon, and an arming wire in retaining engagement with said shaft, said arming wire when withdrawn from retaining engagement causing said rotor to be released for rotation of said washer pile and thereby causing release of said cover when said cam member is rotated by said washer pile to release said ball-locking device in response to kinetic energy of said inertial mass suddenly applied thereto.

5. Apparatus for releasing the cover of a parachute pack after a predetermined time delay and comprising, a parachute pack, a ball-locking member comprising a plurality of balls centrally mounted within said pack, a cover for said pack, a member engageable by said locking member and secured to said cover, a rotatable cam member initially holding the balls of said ball-locking member in locking engagement with said engageable member and releasing said balls to unlocking position when said cam member is rotated, means including a normally locked spring loaded rotatable mass operatively connected to said cam member for forcibly rotating said cam member, means for releasing said mass for rotation by said spring at an increasing rate while kinetic energy is being built up therein, said last named means including a spring pressed shaft normally retained in an initial position by a pin and effective to unlock said mass as the pin is withdrawn, and a washer pile interposed between and in operative connection with said cam member and said rotatable means, said washer pile having a plurality of rotatable washers each having a lost motion connection with the next adjacent washer whereby as the first of said washers is rotated by said rotating means a time delay is introduced prior to rotation of each succeeding washer until said cam is rotated by the last of said washers in response to said kinetic energy suddenly applied thereto thereby to release the cover from the pack.

6. Apparatus for introducing a time-delay prior to the release of the cover of a parachute pack comprising, in combination, a parachute pack, a cover releasably secured to said pack, a pile formed of a plurality of circular washers, each of said washers having an axial bore therethrough and an ear formed on the periphery thereof, a lug formed on each ear and adapted to engage the ear of the next adjacent washer, a shaft extending through said axial bores and supporting said washers for rotation thereon, a normally locked rotatable inertial mass, a preloaded spring for rotating said mass as the mass is released, means for releasing said mass for rotation, said last named means including a pin disposed transversely within the shaft, means operatively connected to said mass and engageable by a first washer at one extremity of said pile for rotating said first washer, a ball lock device for releasing said cover, and a rotatable cam connected to the last washer at the other end of said pile and operatively connected to said ball lock device whereby rotation of said first washer causes rotation of each washer in sequential order as adjacent lugs and washers engage will cause release of said cover in response to the inertial force of said mass suddenly applied to the ball lock.

7. Inertia actuated apparatus for releasing the cover of a parachute pack a predetermined period of time after launching thereof and comprising, in combination, a parachute pack, a casing secured within said pack, a cover for said pack, and arming wire detachably connected to said apparatus, a member secured to said cover and insertable in said casing, means operatively connected to said member for releasably locking the member in said casing and having a locking position and an unlocked position, normally locked rotatable means including a preloaded spring driven mass and set into operation by the launching of the pack as the arming wire is withdrawn for driving said releasable locking member from the locking position to the unlocked position in response to kinetic energy of said mass suddenly applied thereto, said last named means being operatively connected to said arming wire and rendered effective as the arming wire is withdrawn, and time-delay means operatively connected between said driving means and said releasable locking means whereby the driving means after initiation remains ineffective to drive the locking means until said predetermined period of time has elapsed.

References Cited in the file of this patent

UNITED STATES PATENTS

| | | |
|---|---|---|
| 2,463,070 | Turner | Mar. 1, 1949 |
| 2,599,151 | Baldwin | June 3, 1952 |
| 2,606,729 | Frieder | Aug. 12, 1952 |